(12) United States Patent
Cotter

(10) Patent No.: US 7,152,451 B1
(45) Date of Patent: Dec. 26, 2006

(54) REACTION DEVICE FOR FORMING EQUIPMENT

(75) Inventor: Jonathan P. Cotter, Dearborn, MI (US)

(73) Assignee: Diebolt International, Inc., Plymouth, MI (US)

( * ) Notice: Subject to any disclaimer, the term of this patent is extended or adjusted under 35 U.S.C. 154(b) by 0 days.

(21) Appl. No.: 11/441,970

(22) Filed: May 25, 2006

(51) Int. Cl.
*B21D 45/00* (2006.01)
(52) U.S. Cl. .......................................... 72/361; 72/420
(58) Field of Classification Search ................ 72/361, 72/405.06, 420, 405.07; 267/119
See application file for complete search history.

(56) References Cited

U.S. PATENT DOCUMENTS 4,282,736 A * 8/1981 Mashburn .................... 72/345
5,974,852 A * 11/1999 Nieschulz .................... 72/427

* cited by examiner

*Primary Examiner*—Lowell A. Larson
*Assistant Examiner*—Debra Wolfe
(74) *Attorney, Agent, or Firm*—Reising, Ethington, Barnes, Kisselle, P.C.

(57) ABSTRACT

A reaction device for forming equipment includes a housing having a mount adapted to be connected to a forming die and a casing carried by the mount. A lift rod is disposed at least partially on the housing for movement relative to the house between extended and retracted positions. The lift rod has a first end disposed in the housing, a second end and a passage extending through the lift rod between its ends. An adapter is connected to the lift rod within the passage and is adapted to be coupled to a lift bar of the forming equipment. A biasing member is disposed between the lift rod and the housing to yieldably bias the lift rod to its extended position.

16 Claims, 3 Drawing Sheets

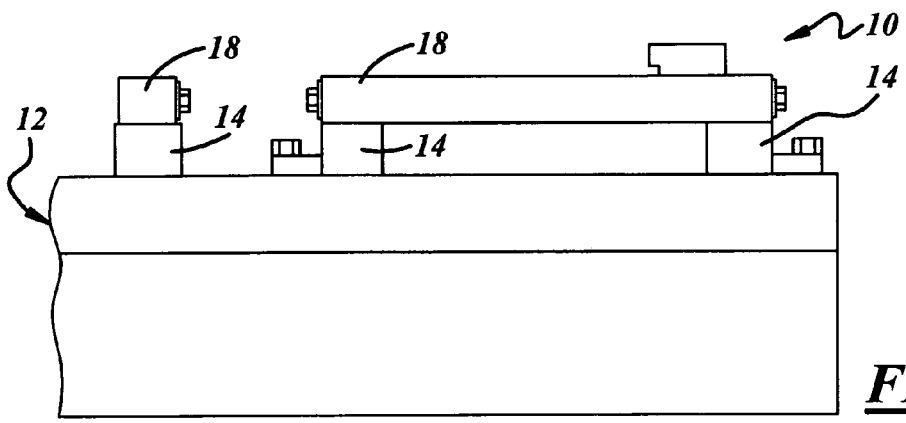
FIG. 1
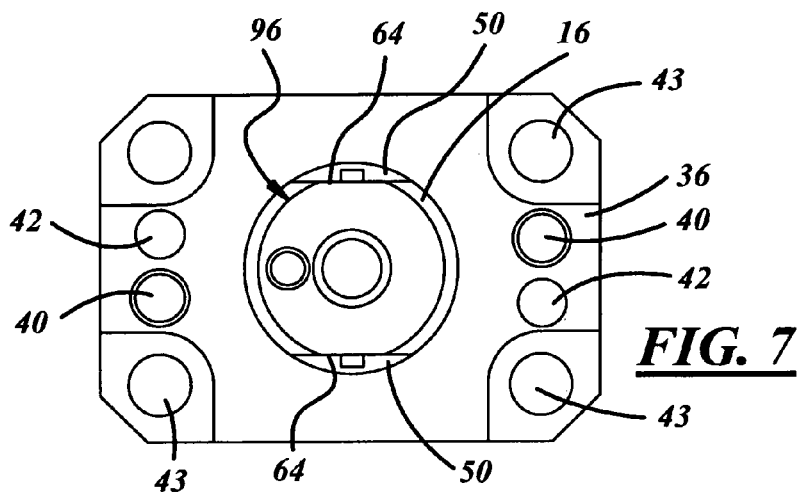
FIG. 7
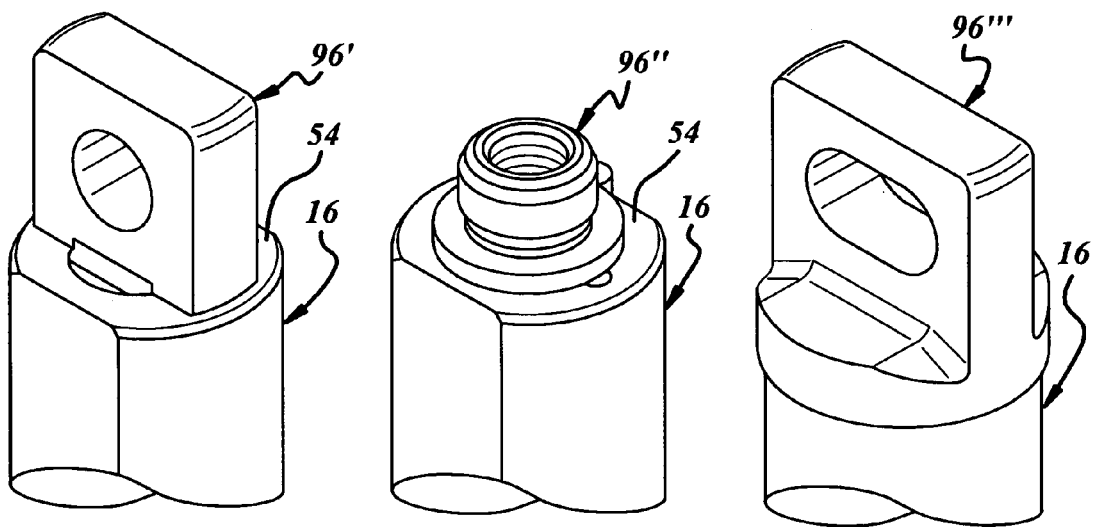
FIG. 8   FIG. 9   FIG. 10

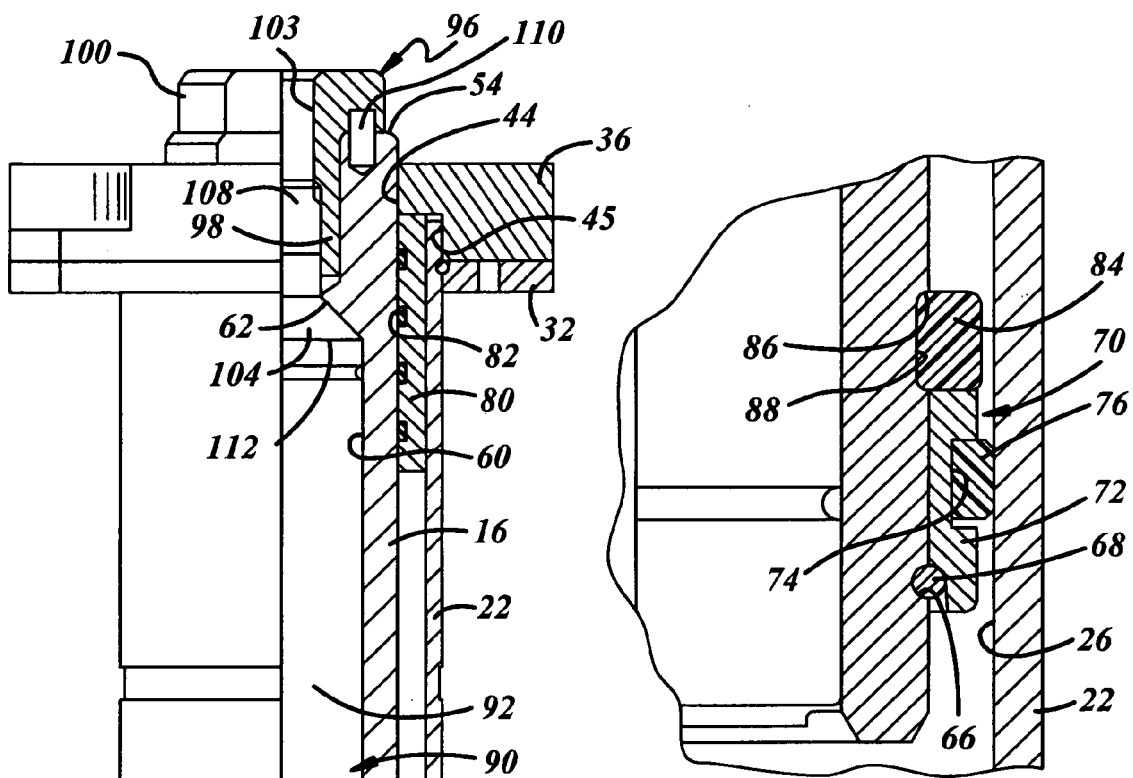
*FIG. 4*
*FIG. 5*
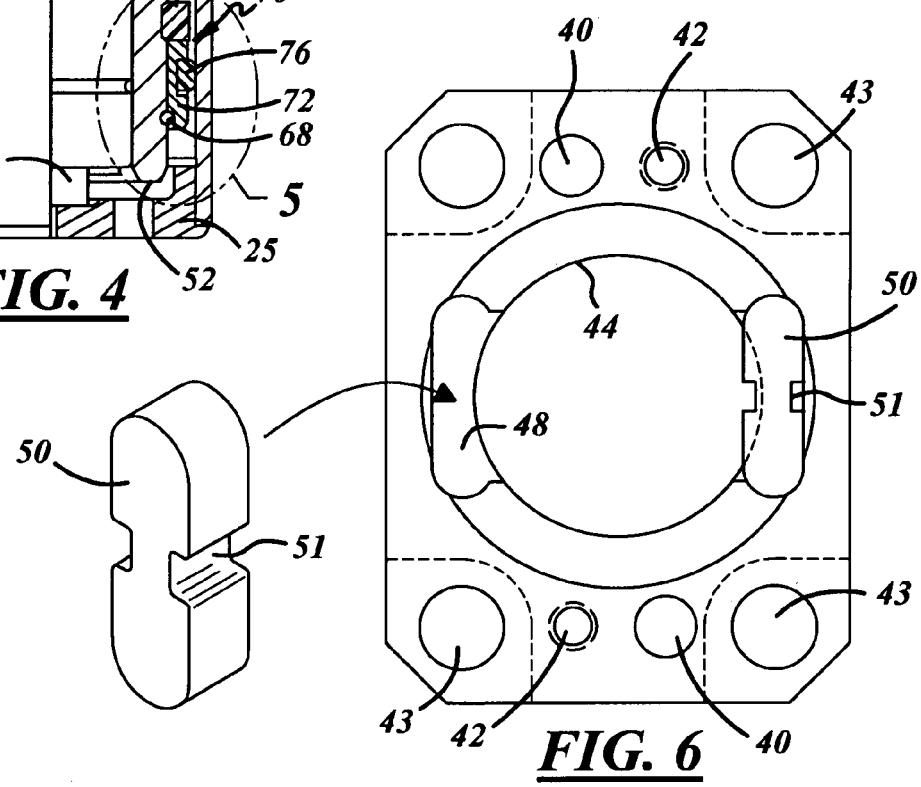
*FIG. 6*

REACTION DEVICE FOR FORMING EQUIPMENT

FIELD OF THE INVENTION

This invention relates generally to forming equipment and more particularly to a reaction device for use with forming equipment.

BACKGROUND OF THE INVENTION

Gas springs commonly are used in various implementations in forming equipment to provide a moveable component or support of a forming die or a workpiece with a yielding force or a return force. For example, in a binder ring implementation, a gas spring provides a yielding force against a binder ring of a forming die to hold a metal workpiece while another part of the forming die forms, cuts, stretches, or bends the workpiece. In a lifter implementation, the gas spring provides a yielding force and return force to lift a workpiece off a surface of the forming die or to otherwise maintain control of the workpiece. Of course, various springs including gas springs can be used in a wide range of other implementations.

In a lifter implementation, a biasing member such as a gas spring is designed for incorporation into a specific forming die and for integration with a specific lift bar configuration. Accordingly, the lifters are custom designed for a particular application and are not suited for use in other forming equipment or other applications.

SUMMARY OF THE INVENTION

A reaction device for forming equipment includes a housing having a mount adapted to be connected to a forming die and a casing carried by the mount. A lift rod is disposed at least partially in the housing for movement relative to the housing between extended and retracted positions. The lift rod has a first end disposed in the housing, a second end and a passage extending through the lift rod between its ends. An adapter is connected to the lift rod within the passage and is adapted to be coupled to a lift bar of the forming equipment. A biasing member is disposed between the lift rod and the housing to yieldably bias the lift rod to its extended position.

In one implementation, the adaptor can be securely connected to the lift rod within the passage of the lift rod, providing for a robust lift rod that can be of conveniently small size. The biasing member may be a gas spring, or other suitable spring sufficient for the intended use. The gas spring may be a self-contained unit disposed in the housing and coupled to the lift rod so that a portion of the gas spring moves with the lift rod. The biasing force of the gas spring returns the lift rod to its extended position to displace a lift bar associated therewith and a workpiece that is in turn associated with the lift bar. Desirably, the forming equipment may be provided with a standard opening in which the casing is received and to which the mount may be connected so that different lifter assemblies may readily be incorporated with the forming equipment. Further, the biasing member and other components of the lifter may be readily changed or replaced to facilitate servicing the lifter and to facilitate the use of common components among lifter assemblies of different size, reaction force, or use of different lift rod adapters, for example.

Some potential objects, features and advantages of the lifter assembly set forth herein include provide a modular lifter assembly that is readily usable with a wide range of forming equipment, readily permits use of common components among lifters of different configuration and construction, can be easily serviced and its components replaced as needed, can be used in a wide range of applications having different size and force requirements, is readily adaptable to a wide range of lift bar configurations, and is of relatively simple design, economical manufacture and assembly, is robust, durable, reliable and in service has a long and useful life. Of course, an apparatus embodying the present invention may achieve, none, some, all or different objects, features or advantages than set forth with regard to the exemplary embodiments disclosed herein.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 1 is a diagrammatic side view of forming equipment including a plurality of lifters that may be used in a progressive die for forming coiled feed stock;

FIG. 4 is a partially sectioned side view of the lifter in its retracted position;

FIG. 5 is an enlarged fragmentary sectional view of a portion of the lifter enclosed in the circle 5 of FIG. 4;

FIG. 6 is an exploded view of a portion of a mount of the lifter;

FIG. 7 is a plan view of the lifter;

FIG. 8 is a fragmentary perspective view of an alternate lift rod adapter;

FIG. 9 is a fragmentary perspective view of another alternate lift rod adapter; and FIG. 10 is a fragmentary perspective view of another alternate lift rod adapter.

DETAILED DESCRIPTION OF THE PREFERRED EMBODIMENTS

Figures 2, 3:
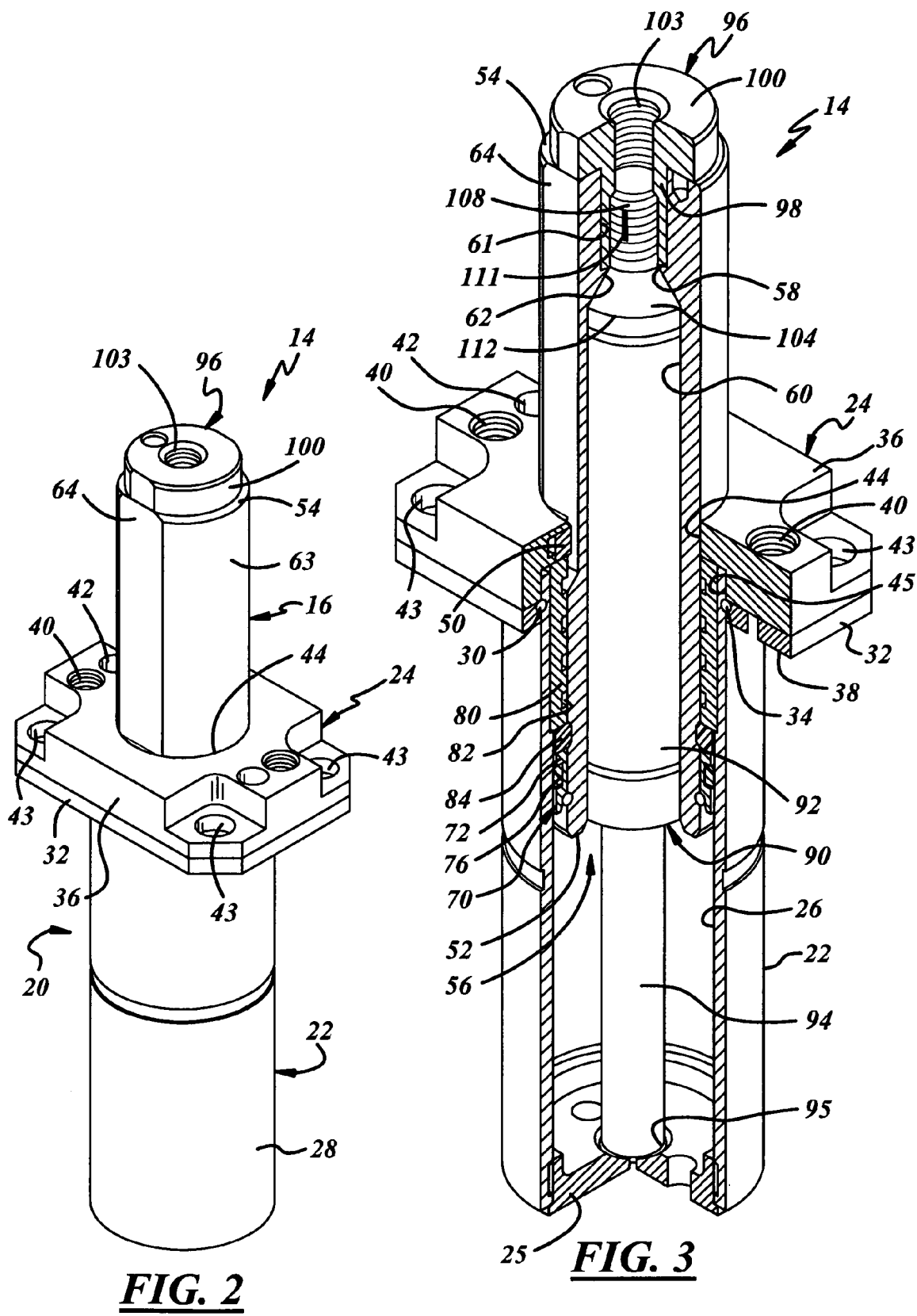
FIG. 2 is a perspective view of one presently preferred implementation of a spring biased lifter.
FIG. 3 is a partially sectioned perspective view of the lifter of FIG. 2 shown in its extended position.

Referring in more detail to the drawings, FIG. 1 illustrates a portion of a progressive die assembly 10 for forming coil feed stock. The die 10 includes a bed 12 to which a plurality of reaction devices such as gas spring lifters 14 are mounted. The lifters 14 include rods 16 (FIG. 2) yieldably biased to an extended position away from the bed 12 and connected adjacent their free ends to a lift bar 18 which spans and interconnects the free ends of adjacent lift rods 16. The lift bar 18 supports, retains or is otherwise associated with the feed stock as the stock progresses through the forming dies 10, in known manner.

As best shown in FIGS. 2–4, one presently preferred implementation of the lifters 14 is of modular design and readily adaptable to a wide range of applications and forming dies. The lifter 14 includes a housing 20 that has a cylindrical casing 22 carried by and attached to a mount 24. The housing 20 preferably also includes an end cap or base 25 carried by the casing 22 and closing the lower end thereof. The base 25 may include external threads that are mated with internal threads at the adjacent end of the casing 22. The casing 22 may economically be formed from a straight cylindrical tube having a straight cylindrical inner surface 26 with threads at one end to retain the base 25 and a straight cylindrical outer surface 28 which may have a circumferential groove 30 formed therein The mount 24 extends outwardly from the casing 22 and may include a first plate 32 retained on the casing 22 by a snap ring 34 or other suitable connection, and a second plate 36 mated to and preferably connected to the first plate 32. The snap ring 34 may be received in the groove 30 formed in the casing 22 and may be trapped between the first plate 32 and second plate 36 of the mount 24. The snap ring connection permits the mounting plates 32, 36 to be disassembled from the casing 22. Alternatively, the mounting plate or plates 32, 36 could be welded or mechanically fastened to the casing 22, by way of examples. Permitting the mounting plates to be removed permits installation of a different mount 24 to, for example, permit repair or replacement or correspond with different mounting holes and different forming equipment.

The first plate 32 has a mounting surface 38 adapted to be disposed adjacent to a forming die. The first and second plates 32, 36 have aligned openings 40, 42 therethrough. Some of the openings 40 may be tapped for threaded receipt of fasteners to facilitate removing dowels from other openings 42. The dowels or locator pins may facilitate accurate alignment and retention of the position of the lifter 14 relative to the forming die. Still other openings 43 may receive fasteners that extend into the forming die 10 to retain the lifter on/in the die 10. The mount 24 preferably also includes a central opening 44 that is coaxially aligned with the interior of the casing 22 to slideably receive a lift rod 16 therein. In the implementation shown, the opening 44 is defined by a bore in the plate 36 which also has a counterbore 45 that receives one end of the casing 22.

As best shown in FIG. 6, one or both mounting plates 32, 36 may include one or more slots 48 in which replaceable key inserts 50 may be disposed to provide a non-circular cross-sectional area of the opening 44. The keys 50 may be formed directly in the mounting plate or plates, or a portion of the casing 22, if desired. The keys 50 may be symmetrical such that they may be rotated or flipped when one surface becomes worn to extend the life of the keys in use. As shown, the keys may include a central groove 51 that may receive a spline on the rod 16, but in the implementation shown, no spline is provided so the keys could be formed without the groove 51. Of course, other configurations or structures could be provided to guide movement of the rod.

The lift rod 16 is slidably received for reciprocation through the opening 44 of the mount 24 and in the casing 22 between an extended position, as shown in FIGS. 2 and 3, and a retracted position, as shown in FIG. 4. The lift rod 16 preferably is generally cylindrical and has a first end 52 disposed in the casing 22 and a second end 54 extending outwardly from the housing 20. A passage 56 preferably is formed in the lift rod 16 and extends between its ends 52, 54. The passage 56 may be comprised of a throughbore 58, a first counterbore 60 and a second counterbore 61 which provides a radially inwardly extending shoulder 62. An outer surface 63 of the lift rod 16 may include a portion 64 having a non-circular cross-sectional area and preferably complementary to the non-circular cross-sectional area defined by the keyed area of the housing such that the keys 50 mate with the lift rod 16 to prevent rotation of the lift rod 16 relative to the housing 20. Of course, the lift rod 16 and the opening 44 in the mount 24 may have a generally circular configuration or other configuration so that the lift rod 16 is not restrained against rotation relative to the housing 20, if desired. As best shown in FIG. 5, the outer surface 63 of the lift rod 16 may also include a circumferentially extending groove 66 in which a retaining ring 68 may be received to retain a retainer assembly 70 on the lift rod 16.

The retainer assembly 70 preferably includes a generally cylindrical and annular body 72 that is disposed at least partially over the retaining ring 68 to trap the retaining ring between the body 72 and the lift rod 16. The retainer assembly 70 preferably is disposed adjacent to the first end 52 of the lift rod 16 and is slidably received for reciprocation with the lift rod 16 within the casing 22. The retaining ring 68 prevents movement of the retainer 70 relative to the lift rod 16 in a direction tending to remove the retainer 70 from the lift rod 16 over its second end 54. The retaining ring 68 may also retain the body 70 against movement in the opposite direction, such as by snap fitting the body 70 over the ring 68 during assembly. The body 72 preferably includes a circumferentially extending exterior groove 74 in which a guide ring 76 is received. The guide ring 76 is preferably formed of a low friction material and has an outer diameter sized for a relatively close fit within the casing 22 to reduce slop or play between the lift rod 16 and casing 22 and to guide the movement of the lift rod 16. The guide ring 76 may be a split ring for ease of assembly onto the body 72, and so that it may be serviced or replaced if necessary.

A bearing ring 80 may also be provided in the casing 22 and surrounding the lift rod 16. The bearing ring 80 may engage the plate 36 of the mount 24 at one end and extend axially in the casing 22. The bearing ring 80 may have an outer diameter that is closely frictionally received in the casing 22 to prevent or limit movement of the bearing ring 80 relative to the casing 22. The bearing 80 may be formed of any suitable material, such as, for example, a bronze material having a plurality of circumferentially extending grooves 82 in its inner surface which may be filled with another material, for example, graphite or other low friction material.

A bumper or stop 84 preferably is carried by the lift rod 16 and is adapted to engage the end of the bearing ring 80 spaced from the mount 24 to limit the movement of the lift rod 16 and define its extended position. The stop 84 may be an annular ring disposed around the lift rod 16 and trapped between a shoulder 86 defined by a groove 88 formed in the outer surface of the lift rod 16 and the body 72. The stop 84 is preferably formed of a resilient material such as, for example, a relatively high durometer urethane to reduce the impact force on the lifter assembly 14 as the lift rod 16 is moved to its fully extended position. The stop 84 may be removed from the lift rod 16 and replaced, preferably independently of the retainer 70, guide ring 76, or any other component of the lifter assembly. In the extended position of the lift rod 16, the stop 84 is engaged along one annular face by the body 72 of the retainer 70 and along the opposite annular face by the bearing 80. Accordingly, the impact loads that are dampened by the stop 84 are transmitted to the lift rod 16 through the body 72 and snap ring 68, and through the bearing 80 to the mount 24 and the fasteners holding the mount to the forming die.

A biasing member 90 such as a gas spring is disposed between the housing 20 and the lift rod 16. The gas spring 90 may be of conventional design and may be a self contained unit having a piston and a supply of pressurized gas contained within a cylinder 92 that is separate from the lift rod 16, such as any of the C-series nitrogen gas springs commercially available from the assignee of this application. Of course, other biasing members may be used, such as coil springs, or other gas springs, if desired. In one range of applications, the gas spring 90 may include a 12 mm–32 mm cylinder 92 with a reciprocating 6 mm–15 mm diameter piston rod 94 extending from the cylinder 92. The gas spring 90 may be charged with gas, such as nitrogen, at a pressure of between about 1,000 psi to about 4,000 psi to provide a wide range of reactive and return forces to the lifter. One exemplary force range, based on an initial charge of 2,600 psi within the gas spring, would be between about 110–700 lb-f. One presently preferred implementation of the lifter 14 includes a gas spring 90 having a cylinder 92 with a 25 mm outer diameter, a 12 mm outer diameter rod 94 with an output on contact of about 450 lb-f. All of the sizes, pressure and force ranges set forth are merely exemplary and are not intended to limit this disclosure of the claims appended hereto.

The gas spring cylinder 92 is preferably received in the counterbore 60 of the lift rod 16 with the piston rod 94 of the gas spring 90 extending therefrom and engaged with the base 25, preferably in a complementary shaped recess 95 (FIG. 3) formed in the base 25. In this manner, movement of the lift rod 16 from its extended position to its retracted position is resisted by the gas spring 90, and movement of the lift rod 16 toward its extended position is accomplished under force of the gas spring 90.

A lift bar adaptor 96 preferably is carried by the free end 54 of the lift rod 16 to facilitate coupling the lift rod 16 to the lift bar 18. The adaptor 96 preferably is connected to the lift rod 16 within the passage 56 by a suitable connector or connection and preferably is releasably or removably connected to the lift rod 16. In one presently preferred implementation, the adaptor 96 has a depending shank 98 disposed in the counterbore 61 of the passage 56, and an enlarged head 100 overlying a portion of the second end 54 of the lift rod 16. The shank 98 may include internal threads that mate with external threads of a threaded fastener 102 and threads 103 that may mate with a fastener (not shown) connecting the adaptor 96 to a lift bar 18. The threads may have different diameters and pitch, as desired for an intended application. The fastener 102 is preferably received through the first end 52 of the lift rod 16 and has an enlarged head 104 that engages the shoulder 62 and a shank 108 extending through the bore 58 and into the mating shank 98 of the adaptor 96 to securely hold the adaptor 96 on the lift rod 16. By way of one of many possible alternate arrangements, the end of the lift rod 16 may be threaded and the adaptor 96 may include threads that mate therewith. The lift rod 16 may carry a dowel 110 that is received in a corresponding bore or blind bore in the adaptor 96 to prevent it from rotating relative to the lift rod 16. To inhibit or prevent the fastener 102 from backing out or loosening from the adaptor 96, the fastener 102 may include a locking mechanism such as a polymeric strip 111 disposed about a portion of the external threads and trapped between the mated threads of the fastener 102 and adaptor 96.

Desirably, the surface area and size of the components connecting the end adaptor 96 to the lift rod 16 may be of a sufficient size to securely retain the adaptor 96 on the lift rod 16 throughout use of the lifter 14. Further, the connection of the adaptor 96 to the lift rod 16 within the passage 56 reduces or eliminates any interference with the coupling or connection of the adaptor 96 to a lift bar 18. In the implementation shown, the shoulder 62 has a generally tapered profile and the head 104 of the fastener 102 has a complimentary shape to provide an increased surface area of engagement between them. The head 104 of the fastener 102 may also include a generally flat outer face 112 which provides a seat against which the cylinder 92 of the gas spring 90 bears in use. The adaptor 96 may be of any size and shape suitable for use with a corresponding lift bar 18. The adaptor 96 may have any desired connection feature for ease of connection to the lift bar, with three examples 96', 96", 96''' shown in FIGS. 8–10.

The lifter assembly 14 may be a modular unit wherein common components can be used across a wide range of applications. For example, the gas spring force can be changed by changing the internal pressure of the gas spring 90, or by substituting a different gas spring having different force characteristics, and the other components like the lift rod 16, housing 20, retainer 70 and lift rod adaptor 96 could be unchanged. Likewise, if a different mount 24, casing 22, lift bar adaptor 96 or lift rod 16 is required, each of those components can be separately swapped out or replaced as desired for a particular application. Further, the machining or prep work required to mount the lifter assembly 14 in a forming die is minimal. The forming die need only have a receptacle or cavity to receive the casing 22 and a relatively flat surface for connection of the mount 24. Accordingly, the modular lifter assembly 14 can be very versatile, robust, easily serviceable and is easy to install and use. Of course, lifter assemblies embodying the present invention may achieve some, none, all or different features or advantages then those stated herein.

Having thus described a presently preferred implementation of the lifter assembly, various modifications and alterations will occur to those skilled in the art, which modifications and alterations will be within the scope of the invention as defined by the appended claims. For example, the reaction device may be used in applications other than as a lifter for a forming die. Of course, still other modifications, substitutions, and implementations may be made.

Accordingly, the lifter may readily be received in a wide range of applications by simply providing the forming equipment with a cylindrical bore to receive the casing and a generally flat mounting surface to which the mount may be firmly connected such as by a plurality of threaded fasteners. In this manner, the same housing assembly may be used with a wide range of lifter assemblies having different internal components, as will be set forth in more detail.

The invention claimed is:

1. A reaction device for a forming die, comprising:
a housing including a mount adapted to be connected to a forming die and a casing carried by the mount;
a lift rod disposed at least partially in the housing for movement relative to the housing between extended and retracted positions, the lift rod having a first end disposed in the housing, a second end and a passage extending through the lift rod between the first end and the second end;
an adapter connected to the lift rod within the passage and adapted to be coupled to a lift bar of the forming die; and
a biasing member disposed between the lift rod and the housing that yieldably biases the lift rod to its extended position.

2. The reaction device of claim 1 wherein the adapter is threadedly connected to the lift rod.

3. The reaction device of claim 1 which also includes a connector disposed in the passage and engaged with both the lift rod and the adapter to retain the adapter on the lift rod.

4. The reaction device of claim 3 wherein the lift rod includes a shoulder extending into the passage, and wherein the connector engages the shoulder and the shoulder is disposed between the portion of the connector that engages the shoulder and the adapter.

5. The reaction device of claim 4 wherein the connector includes a head and a threaded portion extending from the head, and the head engages the shoulder and the threaded portion is threadedly connected to the adapter.

6. The reaction device of claim 5 wherein the head defines a seat that is engaged by the biasing member.

7. The reaction device of claim 1 wherein the adapter includes a shank that extends into the passage and is connected to the lift rod.

8. The reaction device of claim 1 wherein the biasing member is a gas spring having a casing that defines a first end of the gas spring and a piston rod extending out of the casing and defining a second end of the gas spring, one end of the gas spring being associated with the lift rod for movement therewith.

9. The reaction device of claim 1 which also includes a stop carried by at least one of the lift rod, the mount or the housing and adapted to limit movement of the lift rod relative to the housing.

10. The reaction device of claim 9 wherein the stop is formed of a resilient material to dampen the impact loads thereon.

11. The reaction device of claim 7 which also includes a connector connecting the adapter to the lift rod and wherein the shank of the adapter includes internal threads and the connector includes an externally threaded portion that mates with the internal threads to connect the adapter to the lift rod.

12. The reaction device of claim 1 which further includes an anti-rotation feature disposed between the housing and the lift rod to prevent rotation of the lift rod relative to the housing.

13. The reaction device of claim 12 wherein the anti-rotation feature includes a noncircular cross sectional portion of the lift rod and an opening in the housing through which the lift rod extends.

14. The reaction device of claim 13 wherein the noncircular cross sectional area of the opening is defined at least in part by an insert carried by the housing.

15. The reaction device of claim 13 wherein the noncircular cross sectional area of the lift rod is defined by a flat surface formed on the lift rod.

16. The reaction device of claim 1 wherein the housing also includes a base removably connected to the casing wherein the biasing member engages the base at one end and the lift rod at its other end to yieldably bias the lift rod away from the base.

* * * * *

UNITED STATES PATENT AND TRADEMARK OFFICE
CERTIFICATE OF CORRECTION

| | | |
|---|---|---|
| PATENT NO. | : 7,152,451 B1 | |
| APPLICATION NO. | : 11/441970 | |
| DATED | : December 26, 2006 | |
| INVENTOR(S) | : Jonathan P. Cotter | |

It is certified that error appears in the above-identified patent and that said Letters Patent is hereby corrected as shown below:

On The Title Page, change (22) to read:
(22) Filed: May 26, 2006

Signed and Sealed this

Tenth Day of April, 2007

JON W. DUDAS
*Director of the United States Patent and Trademark Office*